(No Model.) 2 Sheets—Sheet 1.
D. W. CRIDER, S. C. HEIRD & T. COCKING.
COMBINED HEDGE AND WIRE FENCE.
No. 588,400. Patented Aug. 17, 1897.
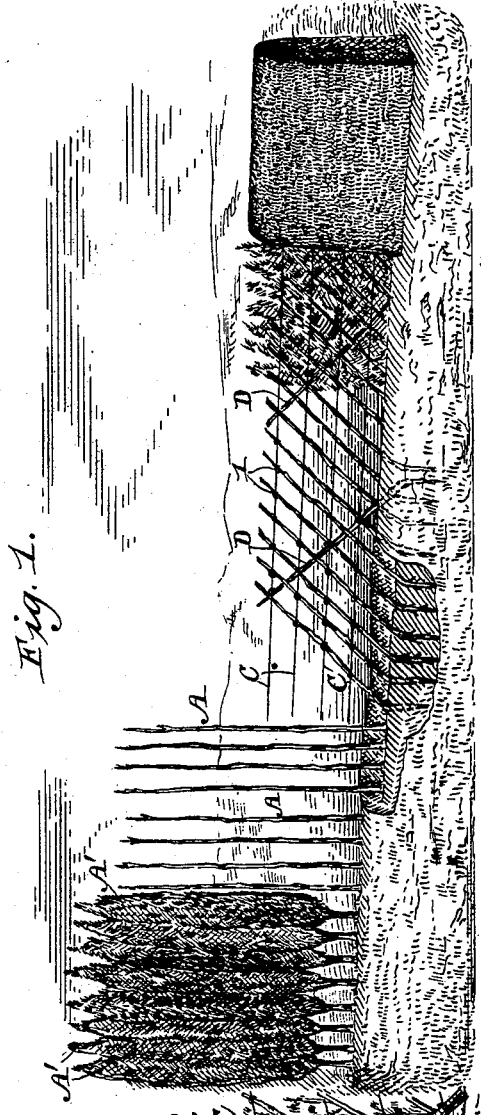
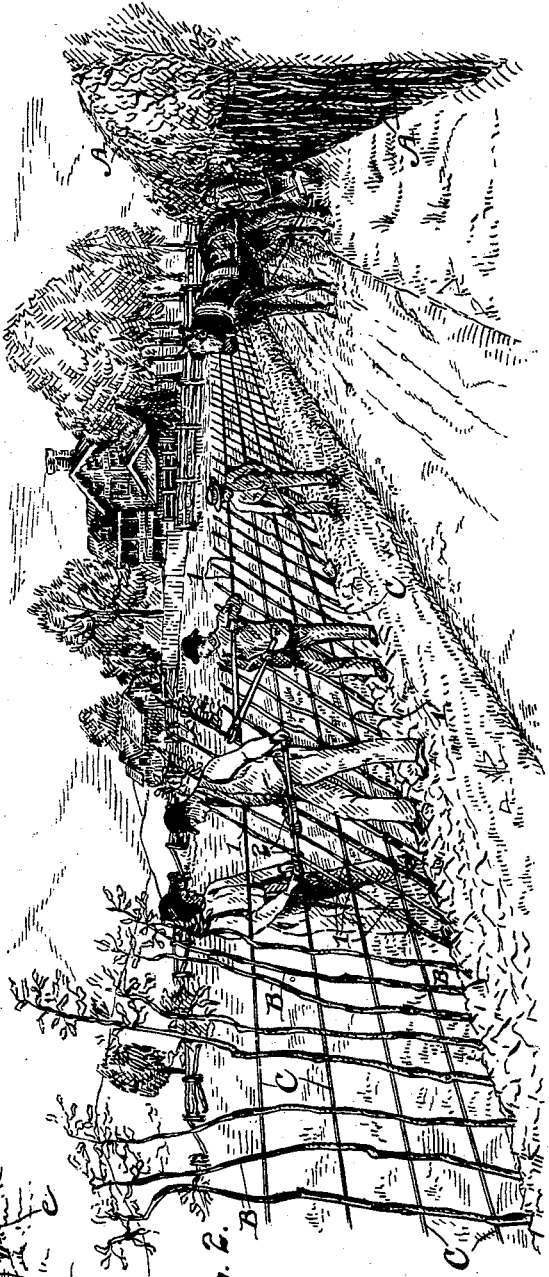
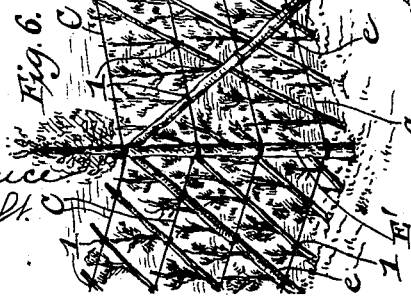
WITNESSES
INVENTORS
David W. Crider.
Samuel C. Heird.
Thomas Cocking.

(No Model.) 2 Sheets—Sheet 2.
D. W. CRIDER, S. C. HEIRD & T. COCKING.
COMBINED HEDGE AND WIRE FENCE.
No. 588,400. Patented Aug. 17, 1897.
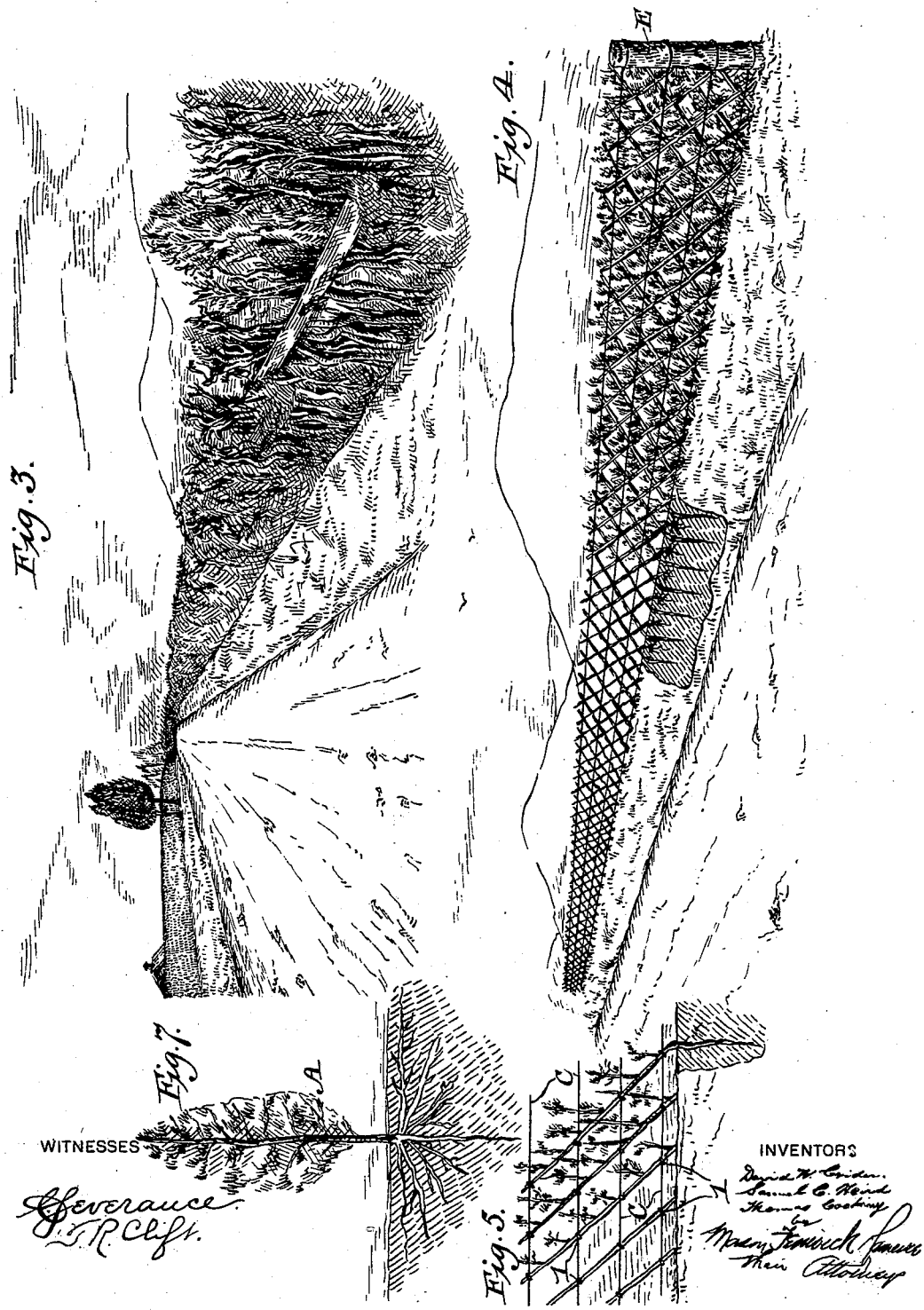

UNITED STATES PATENT OFFICE.

DAVID W. CRIDER, OF YORK, PENNSYLVANIA, AND SAMUEL C. HEIRD, OF CATONSVILLE, AND THOMAS COCKING, OF TOWSON, MARYLAND, ASSIGNORS, BY DIRECT AND MESNE ASSIGNMENTS, TO THE NATIONAL HEDGE AND WIRE FENCE COMPANY, OF YORK, PENNSYLVANIA.

COMBINED HEDGE AND WIRE FENCE.

SPECIFICATION forming part of Letters Patent No. 588,400, dated August 17, 1897.

Application filed December 10, 1896. Serial No. 615,177. (No model.)

*To all whom it may concern:*

Be it known that we, DAVID W. CRIDER, residing at York, in the county of York and State of Pennsylvania, and SAMUEL C. HEIRD, residing at Catonsville, and THOMAS COCKING, residing at Towson, in the county of Baltimore, State of Maryland, citizens of the United States, have invented certain new and useful Improvements in a Combined Hedge and Wire Fence; and we do hereby declare the following to be a full, clear, and exact description of the invention, such as will enable others skilled in the art to which it appertains to make and use the same.

Our invention relates to the construction of live fences from osage-orange, privet, and other plants.

It consists of certain novel constructions, combinations, and arrangements of parts, as will be hereinafter described and specifically claimed.

The object of our invention is to utilize old overgrown hedges and to produce new dwarfed ornamental live fences from new plants and their growth which can be conveniently and permanently kept in shape and under control at comparatively slight cost.

In the accompanying drawings, Figure 1 is a perspective view showing the progressive steps in producing a live fence under our method and means. Fig. 2 is a perspective view of a farm and roadway, showing on one side a live fence being prepared for plashing and on the other side of the roadway a live fence which is being plashed in accordance with our method. Fig. 3 is a perspective view of a roadway, showing on the left-hand side a live fence constructed in accordance with our method and means and on the right-hand side an unattended, declining, overgrown hedge and fence. Fig. 4 is a perspective view of a modified form of fence made in accordance with our invention and preferably constructed of osage-orange plants and privet-plants. Fig. 5 is a perspective view of a portion of a live fence made in accordance with our improved method, the plants being plashed and stapled to wires, and showing the new growth from the upper sides of the plants. Fig. 6 is a perspective view of a corner of a portion of a live fence made in accordance with our invention and showing a live plant, which is used as a corner or end post, and also bracing-plants; and Fig. 7 is a perspective view of a plant which is used in the construction of our hedges and showing the growth of the branch roots and the life or tap root before the branch roots are cut off.

A in the drawings represents plants, which may be osage-orange, privet, or any other suitable plant, used in the construction of live or hedge fences. These plants are placed in the ground, in a straight line, from six to ten inches apart, as circumstances may require, and allowed to grow, with proper cultivation, from three to four years until the canes have grown to be from one to two inches in diameter, as represented at A' in Fig. 1. When the plants have reached this stage, they are trimmed on all sides, as is shown being done on the right-hand side of Fig. 2. After the plants have been brought to this condition a root-cutter, of plow form, is run along first on one side of the plants and then on the other side, so as to cut and remove all side branch roots from the plants which can be reached by the cutter. The remaining branch roots—for instance, those between the plants—are removed in any suitable manner, leaving only the life or tap root. We regard this feature of removing branch roots, except the life or tap roots, as very important, as it not only dwarfs the plants and prevents them from spreading, but retains all of the necessary sap in the plant itself and only the life or tap root has to be fed from the ground, thus overcoming the objection to live fences, that the extending branch roots absorb the nutriment and moisture from the surrounding vegetation and crops.

By cutting off all the branch roots on both sides of the fence and in between the plants as well we can maintain a narrow fence from eight to ten inches in width at the bottom, which is very desirable in live fences and which has heretofore been unattainable under other methods of constructing live fences. After the plants have been brought to the condition shown at B B in Fig. 2 strands of wire C C are stretched along the canes or plants, as shown in Figs. 1 and 2, by suitable wire-fencing machinery. The plants or canes are then bent over to an angle of about forty-five degrees, and each cane or plant is held in position along the wire strands by means of staples 1, which straddle the wires and are embedded in the canes by the use of a staple-driver 2, as shown in Figs. 1 and 2.

We have found that it is very advantageous to employ staples over any other means for securing the canes to the wires or to each other, as a staple only bears upon the cane on one side and does not cut the bark of the cane all around, as twisted wire or links would do. After the canes have been bent over and secured in position along the wires, as before described, the tops are pruned by being cut off about three inches above the top wire and the dirt formerly removed by the root-cutter is thrown back over the tap or life root, as shown in Fig. 2. About every one or two rods apart an additional plant D is located between and slightly to one side of two other plants in the main line, as shown in Fig. 1, and these plants or canes are bent over in a reverse direction to the other canes in the main line and are secured in position along the strands of wire and to the said other canes by means of staples, at about an angle of forty-five degrees, thus forming a stay or brace for the fence at right angles to the other canes, which prevents the wires from stretching further or becoming relaxed, the whole construction and arrangement producing a very strong, elastic, and durable live fence. By slanting the plants or canes and securing them in these positions, as shown and described, the sap flows to the top of the canes and the new growth shoots out from the upper sides of the canes only, thus producing a narrow and compact live fence. It will also be observed that by this method, as we have found by experiment and practical tests, the sun's rays can strike the plants from top to bottom, so that the foliage will be as thick if not thicker at the bottom than at the top, making the fences dense and impenetrable at the bottom, which is greatly desired in a fence of this kind.

The method used and the means employed thus far described practically complete the form of fence shown in Figs. 1, 2, and 3, and it is only necessary to trim properly the same by the use of approved machinery to maintain a perfect and beautiful live fence, as shown in the left-hand side of Fig. 3, at comparatively slight cost.

We have described a live fence which has been planted and cared for in an orderly and proper manner according to our method, but we contemplate and have actually applied our method to old and overgrown fences, such as is shown in the right-hand side of Fig. 3, Fig. 3 being a copy of a photograph taken from nature.

In Fig. 4 we have shown a modified form of our fence. The method of starting and planting this fence is practically the same as shown in Figs. 1 and 2 and as heretofore described. After the plants or canes have been properly trimmed and the branch roots removed and the wires strung every other cane is bent in one direction to an angle of forty-five degrees and secured in position by staples and every alternate cane is bent about the same angle in a reverse direction and secured to the wires on the opposite sides of the fence. In starting this form of fence the plants are placed in a zigzag manner, every other plant being on the same line with the other. By this method a vertical space is left between the plants, and the wires can be strung in this space and the plants stapled to the same, as shown and described, very conveniently, thus producing a strong and compact fence which cannot be penetrated by small or large stock.

In Fig. 4 we have shown an end post E constructed of dead material, but we contemplate employing a plant at this point and hastening its growth by highly cultivating the same.

In Fig. 6 we have shown a portion of a corner of a fence and a live plant E' for a corner-post. The advantage of using a plant as an end or corner post over dead material is that it lasts as long as the fence and does not have to be replaced. Where a live corner or end post is used, we contemplate bracing the same by means of live plants e e, which are stapled or in any other suitable manner secured to said corner or end post, as shown in Fig. 6. In order to have the live corner or end post and the brace-stays large and hardy to adapt them for this purpose, we reinforce their growth by means of phosphates or other fertilizers.

By our improved method and construction we produce a live fence which can be maintained for generations at slight expense and kept symmetrical and beautiful in appearance with comparatively little labor without having to be renewed, which cannot be done with a dead fence constructed of wood, iron, stone, or other dead material.

Having now described our invention, what we claim as new, and desire to secure by Letters Patent, is—

1. A combined hedge and wire fence comprising in its construction plants placed at suitable distances apart having their branch roots removed leaving the life or tap roots, the plants being secured in position on longitudinal wires at angles of approximately forty-five degrees, means for bracing and holding the plants in one or both directions, and means for securing the plants to the longitudinal wires, substantially as described.

2. A combined live hedge and wire fence comprising in its construction plants having their branch roots removed, leaving the life or tap roots, and secured in position at angles of approximately forty-five degrees, longitudinally-arranged wires, and dwarfed bracing-plants placed at suitable distances apart and bent reversely to the other plants at approximately the same angles, and means for securing all the plants including the dwarfed bracing-plants in position upon the longitudinal wires, substantially as described.

3. A combined live hedge and wire fence comprising in its construction plants having their branch roots removed, leaving the life or tap roots, one-half of the plants being bent in one direction at angles of approximately forty-five degrees, and the other plants bent in a reverse direction at approximately the same angles, longitudinally-arranged strands of wire, substantially as described.

4. A combined live hedge and wire fence comprising in its construction plants having their branch roots removed, leaving the life or tap roots, and placed in a zigzag manner, one-half of the plants being bent in one direction at angles of approximately forty-five degrees, and the other plants being bent in a reversed direction at approximately the same angles, longitudinally-arranged strands of wire, and means for securing the plants in position on the wires, substantially as described.

5. A live fence comprising in its construction plants placed at suitable distances apart and secured in position at angles of approximately forty-five degrees, longitudinally-arranged strands of wire, staples or other suitable means for securing the plants to the strands of wire, a live end or corner post, and bracing means consisting of live plants bent over and secured to the live post, substantially as described.

In testimony whereof we affix our signatures in presence of witnesses.

DAVID W. CRIDER.
SAMUEL C. HEIRD.
THOMAS COCKING.

Witnesses as to D. W. Crider and S. C. Heird:
JAMES HEWES,
WM. H. JONES.

Witnesses as to Thomas Cocking:
JOHN B. LONGNECKER,
JAMES KELLEY.